United States Patent
Bloomfield et al.

(10) Patent No.: US 6,411,204 B1
(45) Date of Patent: Jun. 25, 2002

(54) DECELERATION BASED ANTI-COLLISION SAFETY LIGHT CONTROL FOR VEHICLE

(75) Inventors: John Bloomfield, Bluffton, SC (US); Niall R. Lynam, Holland, MI (US)

(73) Assignee: Donnelly Corporation, Holland, MI (US)

(*) Notice: Subject to any disclaimer, the term of this patent is extended or adjusted under 35 U.S.C. 154(b) by 0 days.

(21) Appl. No.: 09/440,497

(22) Filed: Nov. 15, 1999

(51) Int. Cl.⁷ ................................................ B60Q 1/50
(52) U.S. Cl. ..................... 340/467; 340/464; 340/466; 340/471; 340/479
(58) Field of Search ......................... 340/467, 479, 340/463, 471, 464, 466, 468, 472, 903, 440, 689

(56) References Cited

U.S. PATENT DOCUMENTS

| | | | |
|---|---|---|---|
| 2,296,667 A | 9/1942 | Hemphill | 177/337 |
| 4,357,594 A | 11/1982 | Ehrlich et al. | 340/72 |
| 4,600,913 A | 7/1986 | Caine | 340/104 |
| 4,807,101 A | 2/1989 | Milde, Jr. | 362/276 |
| 4,890,091 A | 12/1989 | Gage, Sr. et al. | 340/467 |
| 4,918,424 A | 4/1990 | Sykora | 340/464 |
| 5,017,904 A | 5/1991 | Browne et al. | 340/479 |
| 5,059,947 A | 10/1991 | Chen | 340/467 |
| 5,111,181 A | 5/1992 | Priesemuth | 340/467 |
| 5,177,685 A * | 1/1993 | Davis et al. | 701/35 |
| 5,258,895 A | 11/1993 | Bosse | 362/281 |
| 5,309,141 A | 5/1994 | Mason et al. | 340/467 |
| 5,410,294 A | 4/1995 | Gold | 340/464 |
| 5,481,243 A | 1/1996 | Lurie et al. | 340/467 |
| 5,581,464 A * | 12/1996 | Woll et al. | 701/35 |
| 5,589,817 A * | 12/1996 | Furness | 340/467 |
| 5,610,578 A | 3/1997 | Gilmore | 340/479 |
| 5,663,707 A | 9/1997 | Bartilucci | 340/464 |
| 5,736,926 A | 4/1998 | Winholtz | 340/479 |
| 6,020,814 A * | 2/2000 | Robert | 340/467 |
| 6,133,852 A * | 10/2000 | Tonkin | 340/903 |
| 6,157,295 A * | 12/2000 | Steiner et al. | 340/440 |

OTHER PUBLICATIONS

Commonly assigned, co–pending U.S. Patent Application Serial No. 09/213,075, filed Dec. 16, 1998, for Information Display in a Rearview Mirror.

\* cited by examiner

*Primary Examiner*—Daniel J. Wu
*Assistant Examiner*—Davetta W. Goins
(74) *Attorney, Agent, or Firm*—Van Dyke, Gardner, Linn & Burkhart, LLP

(57) ABSTRACT

An anti-collision safety light control for a vehicle includes a microprocessor which receives one or more inputs and controls an output of at least one indicator or signaling device in response to the inputs. The microprocessor is continuously powered or energized when the vehicle is in use, such that the indicator may be modulated in situations when the brake pedal of the vehicle is not applied. Preferably, an accelerometer may be included with the safety light system to provide a deceleration signal to the microprocessor, which may determine whether the deceleration is at or above one or more threshold levels and correspondingly modulate the indicator in accordance with the particular threshold level encountered. The microprocessor may modulate the indicator independent of actuation of the brake pedal by a driver of the vehicle.

83 Claims, 2 Drawing Sheets

DECELERATION BASED ANTI-COLLISION SAFETY LIGHT CONTROL FOR VEHICLE

BACKGROUND OF THE INVENTION

This invention relates generally to safety lights for vehicles and, more particularly, to a safety light control to warn a driver of another vehicle of a hazardous condition associated with the subject vehicle.

Brake lights vehicles are provided on vehicles to signal drivers of other vehicles that the brake system of the subject vehicle has been actuated. In order to reduce rear end collisions, center high mounted stop lamps (CHMSL) have been added to most vehicles to further enhance visibility of the brake lamps when they are activated. However, conventional stop lamps do not relay information to following vehicles pertaining to the rate of deceleration or degree of braking of the subject vehicle.

Some proposed devices flash the stop lamp or illuminate and/or flash a separate light on the vehicle when the vehicle is braking, in order to further alert other drivers. These systems are triggered by actuation of the brake system of the vehicle, such that the flashing of the stop lamp or activation of a separate light is in addition to the activation of the conventional brake lights of the vehicle. The lamp may be flashed or modulated in response to a brake pressure of the brake system, vehicle speed, inertial forces or deceleration of the vehicle. Some of these devices further flash the stop lamp or separate light when the degree of braking is above one or more predetermined threshold levels.

To date, the proposed devices discussed above are operable to modulate the stop lamp or separate light principally when the driver of the vehicle is depressing a brake pedal or otherwise actuating the brake system of the vehicle. Accordingly, the proposed devices are not continuously operable, since they are only energized when power to the brake lights is also applied. This results in a slower response time of the system, since the system must power-up and determine if the lamp should be flashed after the brake pedal has been depressed. Not only does this result in a delay before the system will react to modulate the stop lamp or separate light, but this further results in a shorter life cycle of the system, since the system is turned on and off every time the brake pedal is depressed.

Another issue with such systems is that they are costly and difficult to implement on existing vehicles, since many of these systems include mechanical devices which are separately installed and/or must be properly oriented within the vehicle. Some embodiments have improved on the installation concerns by including the system within a light bulb module to facilitate easy installation of the system onto an existing vehicle. However, such a device fails to account for the various configurations of light sockets on different vehicles, which make it difficult to properly orient the device in many applications. Proper horizontal or vertical orientation is required for an accelerometer which may be implemented for use with the system. Also, such embodiments enhance serviceability concerns because the entire module must be replaced when the light bulb goes out.

While most of the proposed devices have not achieved commercial success, some cars today are equipped with brake light systems which flash the stop lamp automatically any time the brake pedal is depressed. However, the lamps associated with these devices may flash during ordinary braking as well as panic braking or other sudden stopping conditions. Accordingly, the stop lamp may fail to alert other drivers to emergency stopping conditions or the degree of braking of the vehicle. Furthermore, because the stop lamp may flash during every application of the brake system of the vehicle, the flashing may become annoying to many drivers over time, especially in slow moving or stop and go traffic conditions, where the stop lamp may be flashing almost continuously. Flashing the stop lamps in every stopping condition will also lose its effectiveness at warning other drivers of a stopping condition, since the drivers of other vehicles may tend to ignore the flashing light. Such systems may become especially annoying and ineffective in cases where the driver of the vehicle rests their foot on the brake pedal, thereby continuously flashing the stop lamps.

With brake actuated systems, a wire connection is required from the brake switch near the front of the vehicle to the light at the rear of the vehicle. This results in increased cost to the system and complexity in the manufacturing processes. Furthermore, serviceability of the brake light system may be compromised, since the additional wires to the light may be difficult to repair or replace. In applications where a vehicle is not manufactured with a center stop lamp, this also makes it difficult to install a rear center mounted stop lamp to the vehicle as an aftermarket device.

An additional issue with the brake actuated systems is that, in the event of a collision or accident, such as a front, rear or side impact, a rapid deceleration may occur without any depression of the brake pedal or actuation of the brake system. Accordingly, the brake or signal light will not be actuated to warn other drivers that an accident has occurred.

SUMMARY OF THE INVENTION

The present invention is intended to provide an anti-collision safety light control which adjusts or modulates an output of an exterior light of a vehicle in response to at least one, and preferably multiple, inputs associated with one or more conditions of the vehicle. Preferably, the anti-collision safety light system is a solid state device which modulates or otherwise adjusts an output of a stop lamp in response to a deceleration of the vehicle which is greater than a threshold level. Preferably the stop lamp is a center mounted stop lamp mounted on a rearward portion of the vehicle. Preferably, the stop lamp is a solid state illumination source, with a fast illumination build time, and, most preferably, the stop lamp is a light emitting diode (LED). The anti-collision safety light system is operable to modulate the stop lamp independent of vehicle braking by an operator of the vehicle.

According to an aspect of the present invention, a vehicular anti-collision safety light system for actuating at least one indicator on a vehicle comprises a microprocessor and an accelerometer, preferably a solid state accelerometer with a rapid response time. The microprocessor receives an input from the accelerometer and controls the output of the indicator in response to the input. The microprocessor controls the output of the indicator independent of a brake system of the vehicle being actuated. The accelerometer and microprocessor are preferably integrally mounted to a circuit board which is positionable on the vehicle. Preferably, the output of the indicator is variably adjusted in response to the degree of deceleration of the vehicle. Preferably, the indicator is a rearward directed center mounted stop lamp on the vehicle.

According to another aspect of the present invention, a vehicular anti-collision safety light system for providing a signal in response to at least one hazardous condition associated with a vehicle comprises at least one indicator and a microprocessor. The indicator is mountable on a rearward portion of the vehicle and is interconnected with a brake system of the vehicle, such that actuation of the brake system correspondingly activates the indicator. The microprocessor at least occasionally adjusts an output of the indicator in response to at least one electronic input. The indicator is operable in a first mode when the brake system is actuated and is further operated in a second mode when the brake system is not actuated. The microprocessor is responsive to the electronic input to at least occasionally interrupt activation of the indicator by the brake system in the first mode and to modulate the indicator in the second mode.

In one form, the vehicular anti-collision safety light system includes an accelerometer for determining an acceleration or deceleration of the vehicle. The microprocessor modulates the indicator when the deceleration of the vehicle reaches a threshold level. Preferably, the microprocessor variably adjusts or modulates the indicator as the deceleration of the vehicle reaches one or more threshold levels. Preferably, the accelerometer is a two axis accelerometer, such that the microprocessor may adjust the output of the indicator in response to a forward or rearward deceleration or a sideward acceleration of the vehicle. This allows the system, for example, to indicate an emergency condition when the vehicle is struck from the side. Preferably, the microprocessor is further responsive to outputs of other devices or systems on the vehicle, such as a proximity sensor, an airbag module, a speed sensor, an anti-lock braking system or the like. Preferably, the microprocessor is interrupt driven by the device outputs.

These and other objects, advantages, purposes and features of this invention will become apparent upon review of the following specification in conjunction with the drawings.

DESCRIPTION OF THE PREFERRED EMBODIMENTS

Figure 1:
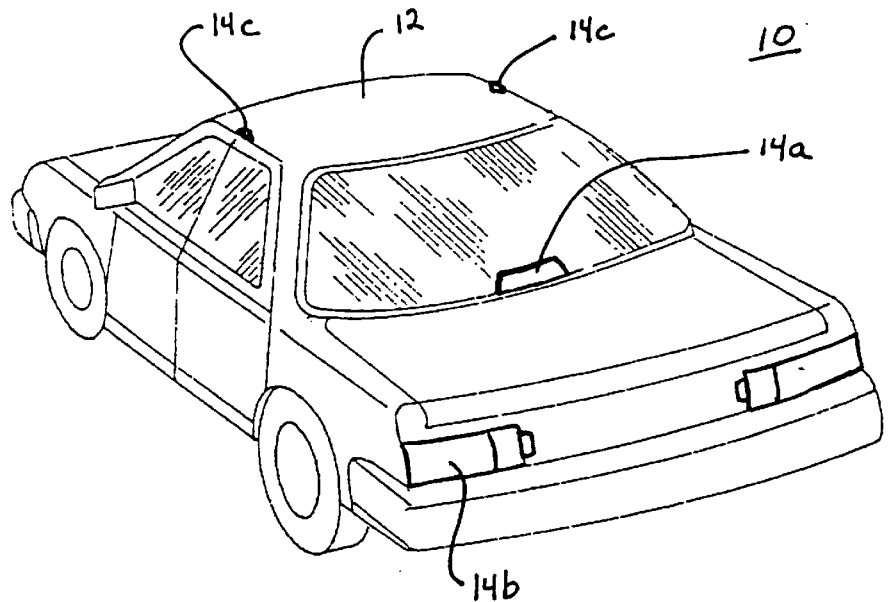
FIG. 1 is a rear perspective view of a vehicle incorporating the present invention.
Figure 2:
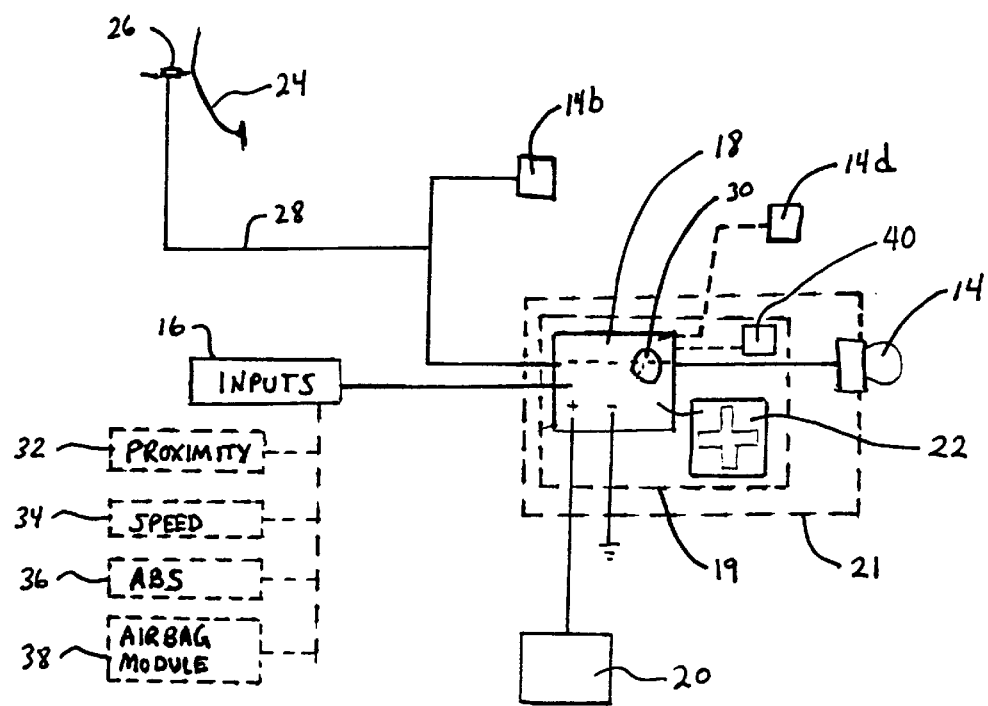
FIG. 2 is a block diagram of a center mounted stop lamp control in accordance with the present invention.

Referring now specifically to the drawings and the illustrative embodiments depicted therein, a vehicular anti-collision safety light system 10 is positioned on a vehicle 12, which may be an automobile, a light truck, a van, a large truck or semi-trailer, a sport utility vehicle or the like (FIG. 1). Safety light system 10 is interconnected with an indicator 14 and actuates, adjusts or modulates an output of indicator 14 in response to one or more electronic inputs 16 (FIG. 2). Preferably, indicator 14 is a center high mounted stop lamp (CHMSL) 14a of vehicle 12, but may be another exteriorly directed light or lights on vehicle 12, such as taillights 14b, headlamps, turn signal indicators or the like or a separately installed signaling device. As shown in FIG. 2, safety light system 10 includes a microprocessor or control 18 which is preferably interconnected with an accelerometer 22. Accelerometer 22 is operable to detect and measure G forces acting on vehicle 12 and to provide a signal associated therewith to control 18 as an input thereof. Control 18 is interconnected with a power source 20, such as a vehicle battery or the like, to provide power to control 18 and indicator 14. Preferably, control 18 may vary the rate of flashing of indicator 14 in response to the deceleration of vehicle 12 reaching one or more threshold levels.

Referring to FIG. 2, microprocessor or control 18 is preferably a solid state device and preferably includes a piezoelectric type accelerometer 22, preferably a conventional solid state accelerometer capable of measuring approximately one G or more of acceleration in one or more directions. In the illustrated embodiment, accelerometer 22 is a commercial available piezoelectric, solid state accelerometer, such as an accelerometer of the type manufactured and marketed by Motorola. Control 18 and accelerometer 22 may be packaged together or integrally constructed on a common printed circuit board or joint integrated circuit 19. Control 18 and accelerometer 22 may thus be packaged as a single, highly compact, solid state module to facilitate installation onto a vehicle. The solid state module may also be entirely epoxy encapsulated, or otherwise packaged to be water impervious, to further improve its durability, such that the control assembly may be mounted anywhere on vehicle 12, including on a portion of the vehicle exposed to the elements, such as precipitation, road splash and the like. Because the solid state circuit board is compact, it may easily be adapted for aftermarket installation in various locations on the vehicle. Preferably, control 18 is configured to be mounted within a housing of CHMSL 14a. Alternately, control 18 and/or accelerometer 22 may be incorporated into the control system of vehicle 12, without affecting the scope of the present invention.

Preferably, accelerometer 22 is a two axis accelerometer, such that accelerometer 22 is operable to detect both lateral and longitudinal acceleration and deceleration of vehicle 12. This allows accelerometer 22 to provide an input to control 18 which communicates an acceleration or deceleration of vehicle 12 in a forwardly or rearwardly direction, as well as a sideward acceleration of vehicle 12. Detection of the sideward acceleration of vehicle 12 provides control 18 with information associated with a side impact of vehicle 12, so that control 18 may modulate indicator 14 to warn drivers of other vehicles that an accident has occurred. Because accelerometer 22 is preferably a solid state device, precise orientation of accelerometer 22 on vehicle 12 with respect to horizontal is not required, since accelerometer 22 is operable to zero or reorient itself each time it is activated. Accelerometer 22 need only be installed with its axes oriented longitudinally and laterally with respect to vehicle 12.

As shown in FIG. 2, indicator 14 is preferably a center mounted stop lamp 14a of vehicle 12 and control 18 preferably is interconnected with a conventional electronic brake light line 28 which provides power to the brake lights 14b and CHMSL 14a of vehicle 12 in response to movement of brake pedal 24. As is known in the art, movement of brake pedal 24 actuates a brake switch 26 or other sensor, which closes a circuit to provide power to line 28. Alternatively, actuation of the brake pedal supplies a ground to the stop lamp of CHMSL 14a. Preferably, control module or circuit board 19 is positioned local to, adjacent to, at or within the CHMSL housing or assembly and is inserted in brake light line 28. This allows control 18 to determine whether an actuation of the brake pedal 24 is passed through to indicator 14. Circuit board 19 may even be mounted within a CHMSL module 21, such as on a portion of a base unit which holds indicator 14. This further facilitates ease of mounting safety light system 10 onto vehicle 12. By including indicator 14 and control 18 within CHMSL module 21, a low cost warning light system may be provided on the vehicle as it is manufactured or as an aftermarket device.

Microprocessor or control 18 is preferably interrupt driven by multiple inputs 16, which may include outputs from accelerometer 22, a proximity sensor 32, a speed sensor 34, an anti-lock brake system 36, an airbag deployment module 38, and/or any other device which may provide information which may be useful to a driver of another vehicle or any other person outside of vehicle 12 and within range of indicator 14 (FIG. 2). Inputs 16 may also be associated with various less hazardous events associated with vehicle 12, such as a detection that an approaching vehicle has its bright lights on, a door is open on vehicle 12, vehicle 12 is over heating and the like. An analog to digital converter (not shown) may be included to convert analog outputs of the various sensing devices to digital inputs to control 18, such that control 18 may process the information and determine whether one or more threshold levels associated with each input or event has been encountered. An appropriate indicator or indicators may then be activated or modulated in response to one or more of these events.

Safety light system 10 is preferably connected with one or more collision avoidance systems or proximity sensors 32, which may be a rear facing camera or sensor, sonar, radar (such as Doppler radar), infrared beam/detector device or similar proximity/approaching sensor devices, such as discussed in commonly assigned and co-pending patent application, Ser. No. 09/213,075, filed on Dec. 16, 1998 by Konrad H. Marcus and Niall R. Lynam, now U.S. Pat. No. 6,124,647, the disclosure of which is hereby incorporated herein by reference. For example, a rear proximity sensor may be directed rearwardly of the vehicle 12 while a forwardly directed sensor may be positioned in a forward portion of vehicle 12 and sidewardly directed sensors may be operable to detect objects to either side of vehicle 12. Similar to accelerometer 22, proximity sensors 32 may be used by control 18 to trigger indicator 14 and/or vary an output thereof independent of braking of the vehicle by the driver. Control 18 may further vary a distance threshold for objects positioned forwardly or rearwardly of vehicle 12 in response to the speed being traveled by vehicle 12 or an approach rate of the object. This facilitates modulation of indicator 14 in situations when vehicle 12 is an unsafe distance from a leading or trailing vehicle, such as when a trailing vehicle is tailgating vehicle 12, while avoiding continuous modulation of indicator 14 when vehicle 12 and other vehicles are traveling very slowly and close to one another in high volume traffic. Preferably, proximity sensor 32 and/or control 18 further determines a rate of approach of a sensed object to vehicle 12, and activates or modulates indicator 14 when the rate of approach exceeds a threshold level, thereby warning approaching drivers of their rapid and unsafe closure rate. Control 18 may further vary the output of indicator 14 in response to varying threshold levels in accordance to the distance and/or approach rate of the object to vehicle 12. Control 18 may further activate a display which may provide information, such as a digital readout of the proximity of the approaching vehicle, to the driver of vehicle 12. It is further envisioned that control 18 may also be connected to a smart brake system of vehicle 12, such that the brake system may modulate the deceleration of the vehicle in order to match the approach rate of the approaching vehicle. This can be accomplished while simultaneously warning the approaching driver via an output of indicator 14.

Additionally, safety light system 10 may be operable as a back up aid. Proximity sensor 32 may detect objects rearward of vehicle 12 when vehicle 12 is traveling in reverse. If a potential collision with an object is about to occur, control 18 may activate a warning signal within vehicle 12, such as a flashing light or an audible tone, to warn the driver of vehicle 12 of the potential danger. Control 18 may further activate an exterior warning signal, such as a light or a horn, to warn people if they are in the path of vehicle 12. Safety light system 10 may thus be useful with a back-up aid of the type disclosed in commonly assigned co-pending U.S. patent application, Ser. No. 09/199,907, filed Nov. 25, 1998 by Brent J. Bos et al., the disclosure of which is hereby incorporated herein by reference.

Control 18 is operable to activate or modulate indicator 14 in response to a detection of one or more threshold levels of one or more of inputs 16. Each input may have one or more threshold levels associated therewith, such that a rate of flash of indicator 14 is varied in response to each threshold level of each input. Preferably, there is an increase in flash rate of indicator 14 corresponding to an increase in a degree of deceleration of vehicle 12. For example, control 18 may have multiple threshold levels for deceleration, such that at a first or lowest deceleration threshold corresponding to hard braking conditions, indicator 14 may be flashed at a slower rate or frequency, while at a second or higher deceleration threshold indicative of very hard stops of vehicle 12, indicator 14 may flash at a higher rate or frequency. Furthermore, at a third or highest deceleration threshold indicative of very fast or panic stops, indicator 14 may be flashed at a higher frequency than the flash rate for very hard stops. Most preferably, control 18 further modulates indicator 14 at a maximum flash rate in response to a collision or impact detection by accelerometer 22. The maximum flash rate may be activated in response to a front, rear or side impact of vehicle 12 or may be activated in response to a vehicle rollover. Control 18 may then function to maintain the maximum flash rate of indicator 14, to continue warning others of the hazardous condition, until safety light system 10 is disconnected at the scene of the accident. Although described as having multiple threshold levels at which the flash rate of indicator 14 changes, clearly the scope of the present invention includes more or less threshold levels and/or continuously varying the flash rate in accordance with the measured deceleration rate. Furthermore, although described as varying the flash rate of indicator 14, control 18 may otherwise adjust the color and/or intensity of indicator 14 in response to one or more threshold inputs, without affecting the scope of the present invention.

By varying the intensity, color and/or rate of flash of indicator 14 in response to different degrees of deceleration and/or impact of vehicle 12, safety light system 10 provides a signal which effectively conveys the nature or condition of vehicle 12 to other vehicles. Furthermore, flashing indicator 14 at very high rates further enhances the effectiveness of the system, since this is a more effective means for attracting the attention of other drivers over slow flashing or continuous illumination. By providing such a signal regardless of whether the brake pedal was applied, safety light system 10 also alerts others to hazardous conditions in situations where the driver of vehicle 12 may not even be aware of or responsive to such conditions. For example, if vehicle 12 collides with another vehicle or object without the driver of vehicle 12 touching the brakes, or vehicle 12 otherwise slows quickly without braking, such as by downshifting or mechanical failure, safety light system 10 may activate and/or modulate the indicator 14 to warn others of the rapid deceleration.

It is further envisioned that safety light system 10 may continue to flash or modulate indicator 14 after the vehicle is no longer decelerating at the threshold level which triggered the system. Indicator may thus be modulated for a period of time after the vehicle has stopped or has been adjusted to a constant speed or to a lower deceleration rate below any threshold level of the system, in order to continue to warn others that the vehicle has experienced a change in velocity. Thus, for example, after sharp braking and a vehicle deceleration therefrom, indicator 14 may continue to strobe or otherwise modulate for a period of time determined by a time out circuit 40 (FIG. 2). Preferably, indicator 14 may be modulated for one to fifteen seconds after the threshold level is no longer detected by safety light system 10. More preferably, indicator 14 may be modulated for two to ten seconds and, most preferably, indicator 14 may be modulated for three to seven seconds after the threshold level is no longer detected by safety light system 10. The amount of time for continuing modulation of indicator 14 may further vary depending on the triggering deceleration rate of the vehicle. For example, if the vehicle last experienced a very high deceleration rate which is indicative of a collision, safety light system 10 may modulate indicator 14 for an extended period of time to warn others that a collision has recently occurred. On the contrary, when a low triggering vehicle deceleration decreases to a level below the lowest deceleration threshold of safety light system 10, the system may continue to modulate indicator 14 for only a very brief period of time following detection of the change in deceleration.

When one or more threshold levels are detected by control 18, indicator 14 is preferably flashed or intermittently energized to signal other drivers of the detected condition. Preferably, indicator 14 is a light emitting diode (LED). Indicator 14 may be a plurality of light emitting diodes in order to facilitate a higher frequency flashing rate over conventional incandescent 5 bulbs. Alternatively, indicator 14 may include two incandescent or LED bulbs or other illumination sources within a common housing. Each bulb may be alternately flashed or modulated to double or achieve a 100% greater effective flash rate for indicator 14 over a conventional bulb. Indicator 14 may include three or more illumination sources within the common housing to further enhance the flash rate. Alternatively, CHMSL module 21 may include a solid state indicator, such as a laser emitting diode or phosphor display, thereby providing a compact solid state safety light system which may be easily adapted for installation on any vehicle. Although indicator 14 of safety light system 10 is preferably the center high mounted stop lamp (CHMSL) 14a, indicator 14 may be a separate indicator positioned on a rearward portion of the vehicle and directed rearwardly therefrom or may be any other exteriorly directed illumination source on vehicle 12, without affecting the scope of the present invention. Indicator 14 may further include an interior display system, such that the driver of vehicle 12 may also receive a warning signal or the like in response to detection of a threshold level of one or more of inputs 16.

Because indicator 14 is preferably a lamp of CHMSL 14a, control 18 may include a signal interrupter in the form of an electronic switch 30, such as a bipolar transistor, a field effect transistor or the like, which intermittently interrupts the signal to or breaks the ground connection of the lamp of CHMSL 14a, thereby causing the lamp to flash. This allows the safety light system to be implemented in a conventional manner, with the CHMSL only requiring a 12 volt power supply connection and a wiring connection to the brake switch 26. This further allows control 18 to be connected with an existing brake lamp, while still allowing the brake lamp to be activated by the brake system of vehicle 12 in a conventional manner during normal driving and/or braking conditions. When brake pedal 24 is actuated, but the deceleration of vehicle 12 is below a first threshold level, control 18 allows the current in brake light line 28 to pass through control 18 to the stop lamp. However, when brake pedal 24 is depressed and a threshold level of at least one of the inputs 16 to control 18 is detected, control 18 and interrupter 30 may repeatedly interrupt the signal from the brake system along brake light line 28 to flash or otherwise modulate the output of CHMSL 14a. Alternatively, control 18 may function to intermittently energize and de-energize indicator 14a in response to the threshold level, while preventing normal activation of the lamp by brake switch 26 when a threshold level is detected, without affecting the scope of the present invention. When a threshold level of at least one of the inputs 16 is encountered independent of any brake pedal actuation, control 18 is further operable to activate and/or modulate indicator 14 independent of actuation of brake pedal 24.

It is further envisioned that control 18 may continuously energize stop lamp 14a under low deceleration rates or low degrees of braking which are below the hard stop threshold limits of control 18, such that stop lamp 14a functions similar to a conventional stop lamp at these lower braking rates. Such a function may obviate the need for any wiring connection between the stop lamp 14a and brake switch 26. This is especially useful with CHMSL module 21, which then only requires connection to power source 20 in order to be operable. Optionally, however, the CHMSL module 21 may be further connected to the brake system. The combination of a solid state illumination sources, such as LEDs, with a solid state accelerometer then facilitates a more rapid response of the system to either a brake pedal actuation or a threshold deceleration level. It is further envisioned that such a module may be implemented on a trailer to provide a deceleration signal to vehicles rearward of the trailer in response to varying degrees of braking or deceleration of the vehicle towing the trailer. This may further obviate at least some of the wires within conventional trailer harnesses.

Preferably, control 18 and accelerometer 22 are activated when vehicle 12 is operated. For example, control 18 may be energized when a vehicle ignition is turned on, when the vehicle is shifted from park or otherwise engages a forward or reverse driving gear or when the vehicle reaches a predetermined velocity. Each time control 18 and accelerometer 22 are activated, control 18 may perform a self check while accelerometer 22 is reoriented with respect to a horizontal orientation. Since this process is only performed when the vehicle is first turned on or driven, this allows time for control 18 to warm up and for accelerometer to orient itself when such processes will not affect the response time of the system. Because control 10 and accelerometer 22 are continuously energized and control 18 periodically samples the inputs, a delay time between an input signal or threshold detection and modulation of indicator 14 is minimized, since there is no awakening of control 18 from a sleep mode and no calibration time associated with accelerometer 22, in response to movement of brake pedal 24 and/or each detected event. Furthermore, the life cycle of control 18 is substantially improved, since control 18 is not activated and deactivated each time the brake pedal is depressed. Accordingly, control 18 and safety light system 10 provide a more rapid response, which is safer and more reliable than warning systems of the prior art.

After control 18 is energized by an initial ignition of vehicle 12 or initial driving of vehicle 12, control 18 samples inputs 16 periodically, and preferably at a high frequency. Because control 18 is a microprocessor, it is capable of sampling several channels or inputs 16 every 10 to 20 milliseconds, and at an even higher frequency if desired. Control 18 may monitor multiple inputs and may further have multiple trigger points or threshold levels for each input. If a threshold level or a condition of any of the inputs 16 is detected by control 18, an appropriate indicator 14 is activated or modulated by control 18.

Preferably, control 18 may activate and/or modulate the stop lamp 14a and other lights or indicators 14d on vehicle 12 in response to the various conditions encountered by one or more of the input devices. The additional indicators 14d are preferably one or more separate illumination sources mounted on the vehicle, and preferably directed exteriorly of the vehicle to warn or otherwise communicate information to other drivers of other vehicles which are approaching or are otherwise near the subject vehicle. Furthermore, the indicators may include a display unit or other communicating device within vehicle 12 to communicate the information associated with the inputs to a driver or passenger of the vehicle. For example, the indicator may be a display unit which displays a determined distance to an object or otherwise warns the driver of vehicle 12 that an object is approaching at an unsafe rate of approach.

The additional indicators or communication devices may be correspondingly activated or modulated along with the stop lamp 14a or may be separately activated or modulated in response to a different threshold level or different characteristic of the various inputs, as received by control 18. For example, if a collision or impact of vehicle 12 is detected, control 18 may activate and/or modulate some or all of the exterior lights on vehicle 12 and may even activate the horn of the vehicle or other audible device to signal other drivers that a collision has occurred. Similarly, if a wheel lock up condition or ABS actuation is detected while no corresponding deceleration is detected, control 18 may determine that vehicle 12 is sliding on ice or the like and flash or illuminate indicator 14 at a high rate or intensity to warn other drivers of the hazardous condition. Additionally, a side indicator 14c (FIG. 1) may be provided on vehicle 12 and may be activated only when a sidewardly approaching object is detected which is approaching vehicle 12 at a rate at or above a threshold level. The threshold level may be associated with a rate of approach of the object and/or a distance to the object. Side indicator 14c thus may function to warn the approaching object or vehicle of the presence of vehicle 12 to reduce the possibility of collision therewith. Similarly, a forwardly directed illumination source may be activated to signal a driver of an approaching vehicle when that vehicle has its bright lights on, or when a collision is imminent between the approaching or leading vehicle and vehicle 12. An audible signal, such as a horn, may also be activated if a potential collision condition is detected by safety light system 10.

Because safety light system 10 includes a microprocessor 18, this further allows for flexibility in the application of the invention, since the threshold levels or inputs or the like may be easily adjusted such that one or more indicators is activated or modulated in a desired manner. Some of the threshold levels may also be automatically adjusted as road and/or driving conditions change. For example, the threshold deceleration levels may be lowered when rain, snow or ice are detected or when an exterior temperature drops below a threshold level. Although control 18 is capable of sampling multiple input channels and providing an output to one or more indicators 14 in response thereto, control 18 may provide very rapid response times while requiring neither a high speed processor nor a large amount of memory. Microprocessor or control 18 is thus a relatively low cost component and easily developed and modified for a particular application.

Figure 3:
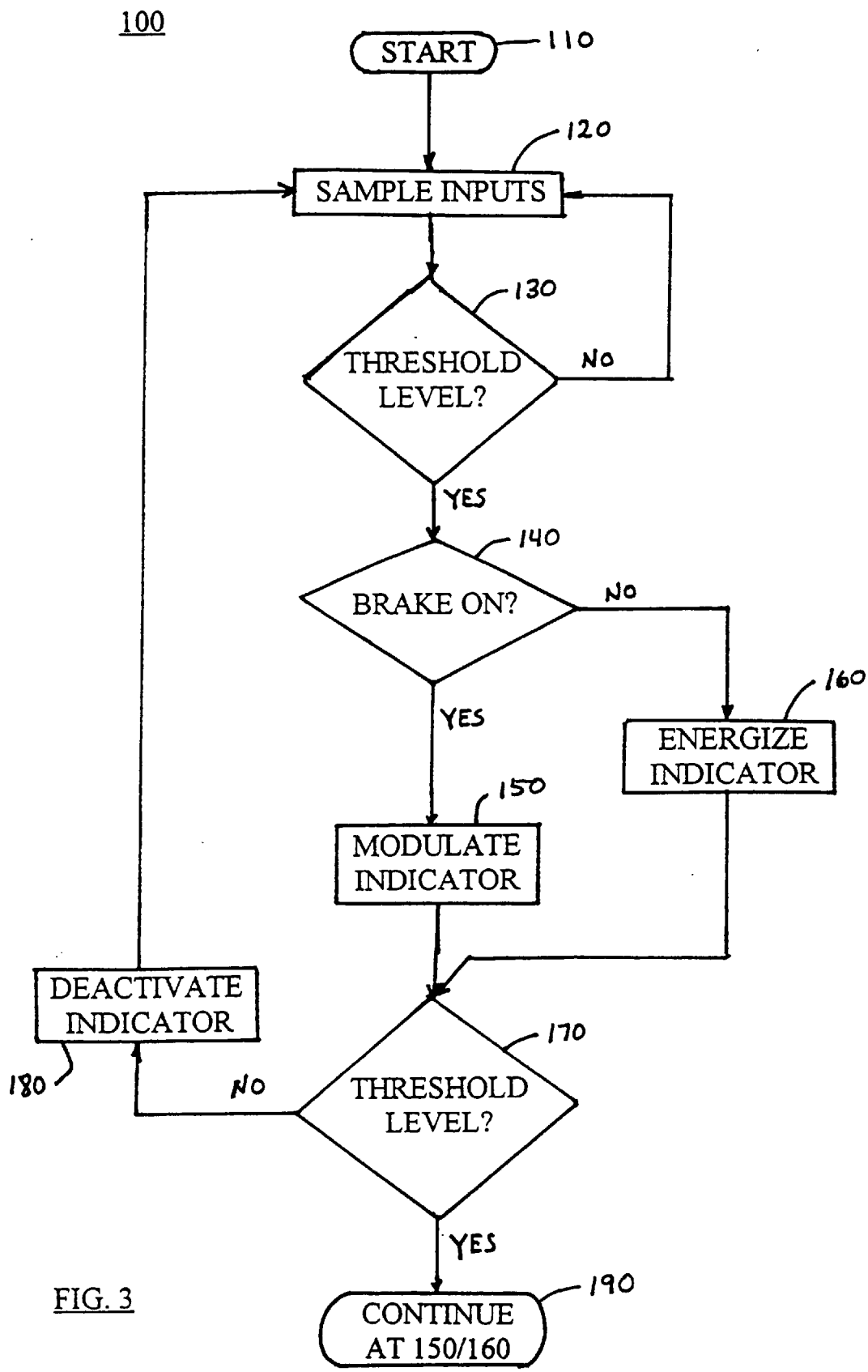
FIG. 3 is a flow chart of the processes performed by the microprocessor of the present invention.

Referring now to FIG. 3, a process 100 for sampling the inputs and modulating indicator 14 is shown. Process 100 starts at 110 when control 18 is energized by turning on the vehicle ignition or shifting to a driving gear of the vehicle. Control 18 samples each of the inputs at 120. If it is determined at 130 that none of the inputs are at a threshold level, then control 18 continues to sample the inputs at 120. If it is determined at 130 that a threshold level has been detected by one or more of the inputs, then it is further determined at 140 if the brake pedal has been depressed or the brake light line is otherwise energized. If it is determined at 140 that the brake light line has been energized, control 18 interrupts or otherwise modulates indicator 14 at 150 at the appropriate rate dictated by the particular threshold level or levels that were detected at 130. If it is determined at 140 that the brake light line has not been energized, then control 18 correspondingly actuates or modulates one or more lights or indicators on vehicle 12 at 160 as dictated by the particular threshold level or levels that were detected at 130. Control 18 continues to modulate indicator 14 until the input no longer provides a threshold signal. If it is determined at 170 that the threshold level is no longer detected, the indicators are deactivated or otherwise no longer modulated at 180 and the system returns to sampling the inputs at 120. If it is determined at 170 that one or more threshold levels is still met by one or more of the inputs, then at 190 the system continues activation or modulation of the indicator or indicators at 150 or 160, until the threshold level is no longer detected.

Therefore, a solid state safety light system is provided which rapidly responds to one or more inputs and activates or modulates an output of at least one indicator or signaling device in response to a detection of a threshold level or hazardous or undesirable attitude or condition associated with the vehicle. The safety light system of the present invention is operable independent of actuation of the brake system of the vehicle and thus may provide warnings to other drivers when the vehicle encounters a dangerous condition to which the driver of the vehicle may not be responsive. The safety light system further allows for normal activation of stop lamps on the vehicle during mild or normal braking conditions and may modulate the stop lamp only when necessary, such as in response to a higher level of braking, deceleration or other hazardous conditions. This improves the effectiveness of the system, since this substantially reduces the likelihood that other drivers will be annoyed by the flashing indicator or that they will tend to ignore the flashing after encountering it many times.

Because the control of the present invention is a microprocessor, multiple inputs may be provided, each of which may be analyzed to determine if a predetermined characteristic or one or more threshold levels have been met. The control may then activate or otherwise modulate one or more indicators, either separately or simultaneously, in response to the particular threshold criteria sensed by one or more of the input devices. This allows the indicator to be variably modulated in response to multiple criteria or threshold levels. Furthermore, additional indicators may be provided on the exterior and/or interior of the vehicle to warn others in the vicinity of the vehicle of a hazardous condition and/or to warn the driver of the vehicle that the vehicle is encountering a hazardous condition.

By incorporating the microprocessor and accelerometer onto a printed circuit board, the present invention further provides a low cost module which may easily be adapted for use in existing vehicle. This provides a substantial improvement over the prior art, since the system is a solid state, interrupt driven device which may be inexpensively manufactured and easily installed to a vehicle during manufacture of the vehicle or as an aftermarket device. Safety light system 10 is also continuously energized while the vehicle is on or being driven, such that response times are substantially reduced over the prior art. This further provides for a longer life of safety light system 10, since activation and deactivation of the system each time a brake pedal is depressed, which may occur many times in a single driving experience, would result in a greatly reduced life cycle of the warning system. The safety light system of the present invention is thus much more reliable and effective over systems of the prior art which are not activated until a brake pedal switch is actuated.

Changes and modifications in these specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A vehicular anti-collision safety light system for actuating an output of at least one indicator on a vehicle, said safety light system comprising:
   a stop lamp configured to be mounted at a rear portion of the vehicle and operable in response to actuation of a brake pedal by a driver of the vehicle, said stop lamp comprising a plurality of light sources, said stop lamp being actuated to illuminate at a generally constant intensity while the brake pedal is actuated;
   an accelerometer which is operable to sense a deceleration of the vehicle; and ,
   a microprocessor for receiving a deceleration input from said accelerometer and modulating the output of said plurality of light sources whereby said plurality of light sources is intermittently energized in response to said deceleration input, said microprocessor modulating the output of said plurality of light sources independent of actuation of the brake pedal of the vehicle, said microprocessor being operable to continue modulating the output of said plurality of light sources independent of actuation of the brake pedal for a period of time following said microprocessor receiving said deceleration input, an amount of said period of time being adjustable in response to a triggering level of said deceleration input received by said microprocessor, said triggering level corresponding to a deceleration level which is at a sufficient level to trigger said microprocessor to modulate the output of said plurality of light sources independent of actuation of the brake pedal.

2. The safety light system of claim 1, wherein said accelerometer and said microprocessor are integrally constructed as a solid state module adaptable for mounting on the vehicle.

3. The safety light system of claim 2, wherein said stop lamp includes a stop lamp base and wherein solid state module is integrally constructed with said stop lamp base to form a stop lamp module.

4. The safety light system of claim 1, wherein said stop lamp comprises a rear center mounted stop lamp on the vehicle.

5. The safety light system of claim 4, wherein said plurality of light sources are actuated irrespective of said microprocessor in a first mode during vehicle braking and actuated by said microprocessor in a second mode when said deceleration input reaches a threshold level independent of actuation of the brake pedal.

6. The safety light system of claim 4, wherein said center mounted stop lamp is adjusted by said microprocessor in response to a first threshold deceleration input to said microprocessor and at least one other indicator is operable by said microprocessor in response to a second threshold deceleration input.

7. The safety light system of claim 6, wherein the at least one other indicator includes at least one of taillights, headlamps, turn indicators, interior lights and horn of the vehicle.

8. The safety light system of claim 1, wherein said microprocessor modulates the output of said plurality of light sources by one of flashing said plurality of light sources and changing an intensity of said plurality of light sources.

9. The safety light system of claim 1, wherein said accelerometer comprises a two axis accelerometer, said two axis accelerometer being capable of sensing an acceleration of the vehicle in a forwardly, rearwardly and sidewardly direction with respect to the direction of travel of the vehicle.

10. The safety light system of claim 1, wherein said microprocessor variably adjusts the output of said plurality of light sources in response to a degree of deceleration of the vehicle, said microprocessor variably adjusting the amount of said period of time in response to a triggering degree of deceleration.

11. The safety light system of claim 10, wherein said microprocessor adjusts the output of said plurality of light sources correspondingly with an increase in the deceleration of the vehicle, said microprocessor adjusting the output when the deceleration of the vehicle is above a first threshold level.

12. The safety light system of claim 11, wherein said microprocessor further adjusts the output of said plurality of light sources as the deceleration of the vehicle reaches at least one other threshold level, said at least one other threshold level being a higher deceleration than said first threshold level, an amount of said time period for said at least one other threshold level being greater than an amount of said time period for said first threshold level.

13. The safety light system of claim 1, wherein said microprocessor variably adjusts the output of said plurality of light sources in response to said deceleration input reaching first, second and third threshold levels, said microprocessor increasing at least one of an intensity and rate of flash of said plurality of light sources as the deceleration increases from said first threshold level to said second threshold level and further increasing said at least one of an intensity and rate of flash said plurality of light sources as the deceleration increases from said second threshold level to said third threshold, said first, second and third threshold levels corresponding to different degrees of deceleration of the vehicle, said second threshold level being greater than said first threshold level and said third threshold level being greater than said second threshold level, said amount of said time period for said third threshold level being greater than said amount of said time period for said second threshold level.

14. The safety light system of claim 13, wherein said microprocessor is responsive to a fourth threshold level indicative of a collision of the vehicle, said microprocessor adjusting said at least one of intensity and rate of flash of said plurality of light sources to a greater level in response to said fourth threshold level.

15. The safety light system of claim 14, wherein said deceleration input includes a forwardly, rearwardly and sidewardly acceleration of the vehicle, said microprocessor flashing said plurality of light sources at a rate corresponding to said fourth threshold level in response to a sideward acceleration of the vehicle.

16. The safety light system of claim 15, wherein said amount of said period of time is at least approximately three seconds when said triggering level is at or above said fourth threshold level.

17. The safety light system of claim 1, wherein said microprocessor is responsive to multiple inputs from multiple sensing devices associated with the vehicle.

18. The safety light system of claim 17, wherein said multiple inputs are associated with at least one of an actuation of an anti-lock brake system of the vehicle, a deployment of an airbag of the vehicle, a collision of the vehicle and an output of a proximity sensing device of the vehicle.

19. The safety light system of claim 18, wherein said proximity sensing device detects a distance to at least one object remote from the vehicle, said microprocessor controlling the output of said plurality of light sources in response to the at least one object being within a threshold distance from the vehicle.

20. The safety light system of claim 19, wherein said threshold distance varies in response to a rate of approach of the at least one object relative to the vehicle.

21. The safety light system of claim 19, wherein said microprocessor variably controls the output of said plurality of light sources in response to at least two threshold distances.

22. The safety light system of claim 18, wherein said proximity sensing device senses a distance to at least one object remote from the vehicle, the at least one object being located at least one of forwardly, rearwardly, and sidewardly from the vehicle.

23. The safety light system of claim 22, further including at least one sidewardly directed light on each side of the vehicle, said microprocessor activating said at least one sidewardly directed light in response to at least one of a distance and approach rate of at least one object sidewardly of the vehicle.

24. The safety light system of claim 18, wherein said proximity sensing device is one of a radar, sonar, Doppler radar and distance-sensing camera.

25. The safety light system of claim 18, wherein said microprocessor flashes multiple exterior lights of the vehicle in response to a collision detection, said microprocessor being operable to continue to flash said multiple exterior lights for a period of time following the collision detection.

26. The safety light system of claim 17 further including at least one interior indicator within the vehicle, said microprocessor communicating a signal to said at least one interior indicator in response to at least one of said multiple inputs being at a threshold level.

27. The safety light system of claim 1, wherein said microprocessor is interrupt driven by multiple electronic inputs.

28. The safety light system of claim 27, wherein said microprocessor samples said multiple inputs to determine if at least one of said multiple inputs is above at least one threshold level, said microprocessor adjusting the output of said plurality of light sources when at least one of said multiple inputs is above said at least one threshold level.

29. The safety light system of claim 28, wherein said microprocessor samples said multiple inputs at least every 50 milliseconds.

30. The safety light system of claim 28, wherein said microprocessor samples said multiple inputs at least every 20 milliseconds.

31. The safety light system of claim 1, wherein said microprocessor is interconnected with a power source of the vehicle, said microprocessor being energized in response to one of an actuation of an ignition of the vehicle, a movement of the vehicle and a shifting into a driving gear of the vehicle.

32. A vehicular anti-collision system for providing an indication in response to at least one hazardous condition associated with a vehicle, said anti-collision system comprising:

a center high mounted stop lamp comprising at least one indicator, said center high mounted stop lamp being mountable to a rear portion of a vehicle, said center high mounted stop lamp being actuatable in response to actuation of a brake pedal of the vehicle whereby said center high mounted stop lamp is actuated to be illuminated at a generally constant intensity in response to actuation of the brake pedal; and a solid state control for receiving multiple inputs and adjusting an output of said at least one indicator in response to said multiple inputs, said control including a microcomputer being interrupt driven by said multiple inputs, one of said inputs being a solid state accelerometer, said control being operable independent of the brake pedal to intermittently actuate said center high mounted stop lamp in response to said solid state accelerometer, said control being integrally constructed with said center high mounted stop lamp to form an indicator module, said control being operable to intermittently actuate said stop lamp in response to a triggering input from said accelerometer which is indicative of a collision of the vehicle, said control being further operable to continue to intermittently actuate said stop lamp for a period of time after said triggering input is received by said control, said period of time being at least three seconds.

33. The anti-collision system of claim 32, wherein said control is interconnected with a power source of the vehicle, said control being energized in response to one of an actuation of an ignition of the vehicle, a movement of the vehicle and a shifting into a driving gear of the vehicle.

34. The anti-collision system of claim 32, wherein said control samples said multiple inputs to determine if at least one of said multiple inputs is above at least one threshold level, said control adjusting said output of said at least one indicator when at least one of said multiple inputs is above said at least one threshold level.

35. The anti-collision system of claim 34, wherein said control samples said multiple inputs at least every 50 milliseconds.

36. The anti-collision system of claim 34, wherein said control samples said multiple inputs at least every 20 milliseconds.

37. The anti-collision system of claim 32, wherein said control and said accelerometer are integrally constructed as a solid state module.

38. The anti-collision system of claim 32, wherein said center high mounted stop lamp is operable in a first mode in response to normal actuation of the brake pedal and in a second mode in response to an output of said control.

39. The anti-collision system of claim 38, wherein said second mode occurs when at least one of said multiple inputs reaches a threshold level.

40. The anti-collision system of claim 38, wherein said at least one indicator is continuously energized in said first mode and said at least one indicator is intermittently energized in said second mode.

41. The anti-collision system of claim 32, wherein said control is operable to adjust said at least one indicator in response to at least one threshold level of said multiple inputs, said control being further operable to continue adjusting said at least one indicator for a second time period following at least one of said multiple inputs lowering to a level below the at least one threshold level.

42. The anti-collision system of claim 32, wherein an amount of said second time period is determined in response to a triggering level of said at least one of said multiple inputs.

43. The anti-collision system of claim 32, wherein said at least one indicator comprises a solid state indicator, said control and said center high mounted stop lamp forming a solid state indicator module.

44. The anti-collision system of claim 43, wherein said solid state indicator comprises one of a light emitting diode, a laser emitting diode and a phosphor display.

45. The anti-collision system of claim 32, wherein said at least one indicator comprises at least two illumination sources within a common housing, such that said control alternatingly flashes said at least two illumination sources in response to said at least one input.

46. The anti-collision system of claim 32, wherein said control is operable to adjust at least one of a rate of repeat, a color and an intensity of said at least one indicator.

47. The anti-collision system of claim 32, wherein an acceleration input from said accelerometer provides a forward and rearward acceleration of the vehicle and a sideward acceleration of the vehicle to said control.

48. The anti-collision system of claim 32, wherein said multiple inputs include an output from at least one of a proximity sensor, a speed sensor, an anti-lock braking system of the vehicle, an airbag module of the vehicle, a collision detection device of the vehicle, a vehicle door switch and a headlamp detector.

49. The anti-collision system of claim 48, wherein said proximity sensor provides a distance to at least one object remote from the vehicle, the at least one object being located at least one of forwardly, rearwardly and sidewardly from the vehicle, said control adjusting said output of said at least one indicator in response to a threshold level of said distance.

50. The anti-collision system of claim 49, wherein said threshold level of said distance varies correspondingly with a rate of approach of the at least one object relative to the vehicle.

51. The anti-collision system of claim 32, wherein said control variably controls said output of said at least one indicator in response to multiple threshold levels of at least one of said multiple inputs.

52. A vehicular anti-collision center high mounted stop lamp module for providing a signal in response to at least one hazardous condition associated with a vehicle, said anti-collision center high mounted stop lamp module comprising:
  a base mountable on a rearward portion of the vehicle;
  a stop lamp adapted to be interconnected with a brake pedal of the vehicle such that actuation of the brake pedal correspondingly energizes said stop lamp in a first mode at a generally constant intensity; and
  a microprocessor controlling an output of said stop lamp in response to at least one electronic input, said microprocessor being operable to continuously energize said stop lamp in said first mode when the brake pedal is actuated and intermittently energize said stop lamp in a second mode when the brake pedal is not actuated and a level of at least one of said at least one electronic input is at or above a threshold level, said stop lamp being energized by actuation of the brake pedal in said first mode, said microprocessor being operable to intermittently energize said stop lamp independent of the brake pedal in said second mode, said microprocessor being further operable to continue to intermittently energize said stop lamp in said second mode for a period of time after said level of at least one of said at least one electronic input is no longer at or above said threshold level and said brake pedal is not actuated, an amount of said period of time being dependent on a triggering level of said at least one of said at least one electronic input.

53. The center high mounted stop lamp module of claim 52, wherein said microprocessor is interconnected with a power source of the vehicle, said microprocessor being energized in response to one of an actuation of an ignition of the vehicle, a movement of the vehicle and a shifting into a driving gear of the vehicle.

54. The center high mounted stop lamp module of claim 52, wherein said at least one electronic input is an output from at least one of an accelerometer which determines a deceleration of the vehicle, a proximity sensor which determines a distance between at least one object and the vehicle, a speed sensor, an anti-lock braking system of the vehicle, an airbag module of the vehicle and a collision detection device of the vehicle.

55. The center high mounted stop lamp module of claim 54, wherein said at least one electronic input is an output from a proximity sensor, said proximity sensor further determining a rate of approach of the at least one object toward the vehicle, said microprocessor being responsive to the distance and the rate of approach of the at least one object.

56. The center high mounted stop lamp module of claim 54, wherein said at least one electronic input is an output from an accelerometer, said accelerometer being a two axis accelerometer, said two axis accelerometer being capable of sensing an acceleration of the vehicle in a forwardly, rearwardly and sidewardly direction with respect to the direction of travel of the vehicle, said amount of said time period being dependent on a triggering degree of the forwardly, rearwardly and sidewardly acceleration of the vehicle.

57. The center high mounted stop lamp module of claim 56, wherein said accelerometer and said microprocessor are integrally constructed as a solid state module.

58. The center high mounted stop lamp module of claim 54, wherein said microprocessor flashes multiple exterior lights of the vehicle in response to a collision detection.

59. The center high mounted stop lamp module of claim 52, wherein said microprocessor is interrupt driven by said at least one electronic input.

60. The center high mounted stop lamp module of claim 52, wherein said microprocessor is operable to intermittently energize said stop lamp independent of the brake pedal in said second mode at a maximum rate of flash in response to said level of at least one of said at least one electronic input being at a level which is indicative of a collision of the vehicle.

61. The center high mounted stop lamp module of claim 60, wherein said amount of said time period is at least approximately three seconds in response to said level of at least one of said at least one electronic input which is indicative of a collision of the vehicle.

62. The center high mounted stop lamp module of claim 52, wherein said stop lamp comprises at least two illumination sources, said at least two illumination sources comprising one of a light emitting diode and an illumination device, said at least two illumination sources being alternatingly intermittently energized in said second mode.

63. A vehicular anti-collision safety light system for providing a signal in response to at least one hazardous condition associated with a vehicle, said anti-collision system comprising:
- a stop lamp comprising at least one solid state indicator and being mountable at a rear portion of a vehicle, said stop lamp being actuatable in a first mode in response to actuation of a brake pedal of the vehicle, said stop lamp being actuated in said first mode at a generally constant intensity when the brake pedal is actuated;
- a solid state accelerometer for determining an acceleration of the vehicle, said accelerometer being a two axis accelerometer positionable on the vehicle such that said accelerometer is operable to detect a forwardly and rearwardly acceleration and a sidewardly acceleration with respect to a directional heading of the vehicle; and
- a microprocessor receiving at least one electronic input and controlling an output of said stop lamp in response to said at least one electronic input, said at least one electronic input being indicative of a forwardly or rearwardly acceleration and a sidewardly acceleration from said accelerometer, said microprocessor being operable to intermittenly actuate said stop lamp in a second mode in response to a triggering level of said at least one electronic input reaching at least one threshold level independent of actuation of the brake pedal, said microprocessor being further operable to continue to intermittently actuate said stop lamp in said second mode for a period of time after said triggering level of said at least one electronic input is no longer at or above said at least one threshold level, an amount of said period of time being determined in response to said triggering level of said at least one electronic input initially received by said microprocessor.

64. The anti-collision safety light system of claim 63, wherein said microprocessor, said accelerometer and said stop lamp are integrally constructed as a solid state module.

65. The anti-collision safety light system of claim 63, wherein said at least one solid state indicator comprises one of a light emitting diode, a laser emitting diode, and a phosphor display.

66. The anti-collision safety light system of claim 63, wherein said microprocessor variably controls said output of said stop lamp in said second mode in response to varying degrees of acceleration of the vehicle in the forwardly and rearwardly direction.

67. The anti-collision safety light system of claim 66, wherein said microprocessor adjustably controls the output of said stop lamp in said second mode as said degrees of deceleration reaches multiple threshold levels.

68. The anti-collision safety light system of claim 67, wherein said microprocessor adjusts a rate of repeat of said stop lamp in said second mode, a first rate of repeat at a lower deceleration threshold level being slower than a second rate of repeat at a more rapid deceleration threshold level.

69. The anti-collision sagety light system of claim 63, wherein said microprocessor variably controls the output of said stop lamp in said second mode in response to a degree of a forward or rearward deceleration of the vehicle reaching first, second and third threshold levels, said microprocessor increasing at least one of an intensity and rate of flash of said stop lamp as said deceleration increases from said first threshold level to said second threshold level and further increasing said at least one of an intensity and rate of flash of said stop lamp as said deceleration increases from said second threshold level to said third threshold, said first, second and third threshold levels corresponding to different degrees of deceleration of the vehicle, said second threshold level being a greater degree of deceleration than said first threshold level and said third threshold level being a greater degree of deceleration than said second threshold level, said amount of said period of time comprising first, second and third time periods corresponding to said first, second and third threshold levels, respectively, said third time period being greater than said second time period, said second time period being greater than said first time period.

70. The anti-collision safety light system of claim 69, wherein said microprocessor intermittently actuates said stop lamp in said second mode to a maximum rate of flash in response to fourth degree of deceleration, said fourth degree of deceleration being greater than said third degree and being indicative of a collision of the vehicle, said amount of said period of time further comprising a fourth time period corresponding to said fourth degree of deceleration, said fourth time period being greater than said third time period.

71. The anti-collision safety light system of claim 70, wherein said microprocessor intermittently actuates said stop lamp in said second mode to said maximum rate of flash in response to a sideward acceleration of the vehicle.

72. The anti-collision safety light system of claim 63, wherein said microprocessor intermittently actuates said stop lamp in said second mode to a maximum flash rate in response to a sideward acceleration of the vehicle.

73. The anti-collision safety light system of claim 72, wherein said microprocessor intermittently energizes multiple exterior lights of the vehicle in response to said sideward acceleration.

74. The anti-collision safety light system of claim 63, wherein said microprocessor is interrupt driven by multiple electronic inputs.

75. The anti-collision safety light system of claim 74, wherein said multiple electronic inputs are associated with at least one of an actuation o an anti-lock brake system of the vehicle, a deployment of an airbag of the vehicle, a collision of the vehicle and an output of a proximity sensing device of the vehicle.

76. The anti-collision safety light system of claim 75, wherein said proximity sensing device detects a distance to at least one object remote from the vehicle, said microprocessor controlling said output of said stop lamp in response to the at least one object being within a threshold distance from the vehicle.

77. The anti-collision safety light system of claim 76, wherein said threshold distance varies in response to a rate of approach of the at least one object relative to the vehicle.

78. The anti-collision safety light system of claim 75, wherein said proximity sensing device is one of a radar, sonar, Doppler radar and distance-sensing camera.

79. The anti-collision safety light system of claim 75, wherein said microprocessor controls an output of multiple exterior lights of the vehicle in response to a collision detection.

80. The anti-collision safety light system of claim 63, wherein said microprocessor samples said at least one electronic input to determine if at least one of said at least one electronic input is above said at least one threshold level, said microprocessor intermittently actuating said stop lamp in said second mode when at least one of said at least one electronic input is above said at least one threshold level.

81. The anti-collision safety light system of claim 80, wherein said microprocessor samples said at least one electronic input at least every 50 milliseconds.

82. The anti-collision safety light system of claim 80, wherein said microprocessor samples said at least one electronic input at least every 20 milliseconds.

83. The anti-collision safety light system of claim 63, wherein said microprocessor is interconnected with a power source of the vehicle, said microprocessor being energized in response to one of an actuation of an ignition of the vehicle, a movement of the vehicle and a shifting into a driving gear of the vehicle.

* * * * *

UNITED STATES PATENT AND TRADEMARK OFFICE
CERTIFICATE OF CORRECTION

PATENT NO.    : 6,411,204 B1
DATED         : June 25, 2002
INVENTOR(S)   : John Bloomfield and Niall R. Lynam It is certified that error appears in the above-identified patent and that said Letters Patent is hereby corrected as shown below:

Column 7,
Line 30, delete "5" after "incandescent"

Column 17,
Line 27, "intermittenly" should be -- intermittently --
Line 53, "degrees" should be -- degree --
Line 61, "sagety" should be -- safety --

Column 18,
Line 18, insert -- a -- before "fourth"
Line 42, "o" should be -- of --

Signed and Sealed this

First Day of July, 2003

JAMES E. ROGAN
*Director of the United States Patent and Trademark Office*